(12) United States Patent
Weitzel et al.

(10) Patent No.: US 7,744,694 B2
(45) Date of Patent: Jun. 29, 2010

(54) USE OF REDISPERSION POWDER COMPOSITIONS WITH ACCELERATED-SETTING ACTION

(75) Inventors: Hans-Peter Weitzel, Reischach (DE); Hermann Lutz, Emmerting (DE); Peter Fritze, Haiming (DE)

(73) Assignee: Wacker Chemie AG, Munich (DE)

( * ) Notice: Subject to any disclaimer, the term of this patent is extended or adjusted under 35 U.S.C. 154(b) by 867 days.

(21) Appl. No.: 10/553,310

(22) PCT Filed: Mar. 4, 2004

(86) PCT No.: PCT/EP2004/002210

§ 371 (c)(1),
(2), (4) Date: Oct. 14, 2005

(87) PCT Pub. No.: WO2004/092094

PCT Pub. Date: Oct. 28, 2004

(65) Prior Publication Data

US 2007/0037925 A1      Feb. 15, 2007

(30) Foreign Application Priority Data

Apr. 17, 2003   (DE) ............................... 103 17 882

(51) Int. Cl.
- *C04B 40/00* (2006.01)
- *C04B 24/24* (2006.01)
- *C04B 24/04* (2006.01)
- *C04B 28/04* (2006.01)

(52) U.S. Cl. .................. 106/802; 524/8; 524/400; 524/425; 524/503; 524/543; 524/650; 524/394; 106/810; 106/823

(58) Field of Classification Search ............ 524/8, 524/394, 400, 543, 650, 503, 425; 106/802, 106/810, 823
See application file for complete search history.

(56) References Cited

U.S. PATENT DOCUMENTS

| | | | | |
|---|---|---|---|---|
| 3,303,147 | A | | 2/1967 | Elden |
| 5,366,550 | A | * | 11/1994 | Schad ..................... 106/730 |
| 5,753,733 | A | * | 5/1998 | Eck et al. ..................... 524/265 |
| 6,331,587 | B1 | * | 12/2001 | Geissler ..................... 524/459 |
| 6,350,808 | B1 | * | 2/2002 | Schmitz et al. ............. 524/503 |
| 6,699,915 | B2 | * | 3/2004 | Hilton et al. ................. 521/83 |
| 2002/0115785 | A1 | | 8/2002 | Weitzel et al. |

FOREIGN PATENT DOCUMENTS

| | | |
|---|---|---|
| DE | 195 31 515 | 2/1997 |
| EP | 1020493 A1 | 7/2000 |
| EP | 1 136 507 | 9/2001 |
| EP | 1 167 317 | 1/2002 |
| JP | 2000233126 A | 8/2000 |
| JP | 2002241450 A | 8/2002 |
| JP | 2002338325 A | 11/2002 |
| WO | 03011922 A | 2/2003 |

OTHER PUBLICATIONS

Derwent Abstract corres. to EP 1167317; [AN 2002-165863].
Derwent Abstract corres. eo DE 195 31 515 [AN1997-146738].
Fox. T.G. Bull, Am. Physics Soc. 1, 3, p. 123 (1956).
Polymer Handbook, $2^{nd}$ Edition, J. Wiley & Sons, N.Y. (1975).

* cited by examiner

*Primary Examiner*—Kelechi C Egwim
(74) *Attorney, Agent, or Firm*—Brooks Kushman P.C.

(57) ABSTRACT

Water-redispersible polymer powder compositions based on a) homo- or copolymers of one or more monomers from the group consisting of vinyl esters of unbranched or branched $C_{1-15}$ alkylcarboxylic acids methacrylic esters and acrylic esters of $C_{1-15}$ alcohols, vinylaromatics, olefins, dienes, and vinyl halides, with one or more protective colloids, and optionally, one or more antiblocking agents, in conjunction with one or more alkali metal or alkaline earth metal $C_{1-4}$ carboxylates as setting accelerants added following polymerization accelerate the setting of construction chemistry products with hydraulically setting binders.

13 Claims, No Drawings

USE OF REDISPERSION POWDER COMPOSITIONS WITH ACCELERATED-SETTING ACTION

CROSS-REFERENCE TO RELATED APPLICATION

This application claims priority to PCT Appln. No. PCT/US2004/002210 filed Mar. 4, 2004, and to German application 103 17 882.1 filed Apr. 17, 2003.

BACKGROUND OF THE INVENTION

1. Field of the Invention

The invention relates to the use of water-redispersible polymer powder compositions with accelerated-setting action, in hydraulically setting systems.

2. Description of the Related Art

Polymers based on vinyl esters, vinyl chloride, (meth) acrylate monomers, styrene, butadiene, and ethylene are used in a wide variety of applications, especially in the form of their aqueous dispersions or water-redispersible polymer powders, for example as coating compositions or adhesives for a very wide variety of substrates. Protective colloids or low-molecular-weight surface-active compounds are used to stabilize these polymers. The protective colloids generally used comprise polyvinyl alcohols.

These products are in particular used as binders in hydraulically setting adhesives, for example in tile adhesives based on cements or calcium sulfate.

Concrete is a very versatile material whose properties can be controlled via numerous parameters. Important properties are, inter alia, workability as a function of time and strength (early strength and final strength) of the concrete. Workability reduces with time as the hydration of the material proceeds. On account of this effect it is possible to add either more water or "superplasticizers". However, both have an adverse effect on the initial and final strength of the concrete. To compensate for these disadvantages, "accelerators" or materials which promote early strength are added, these leading to higher initial and final strength.

EP-A 1136507 describes tertiary alkanolamines as accelerators long known to the person skilled in the art. A disadvantage is that these compounds are highly active nucleophiles and therefore hydrolyze the ester groups in the polymer-containing binders mostly used, based on vinyl acetate-ethylene copolymers or on styrene-acrylate copolymers, and degrade the effectiveness of the binders. In EP-A 1136507 the alkanolamines are therefore linked by a complicated method to a polymer skeleton.

EP-A 1167317 describes the use of alkali metal hydroxides, of alkali metal carbonates, of alkaline earth metal chlorides, and particularly of aluminum salts, as setting accelerators and hardening accelerators for concrete. A disadvantage with the acceleration of cement setting by means of these compounds is, however, the decrease in mechanical strength.

SUMMARY OF THE INVENTION

It was therefore an object to provide a means for acceleration of setting of hydraulically setting systems which eliminates the disadvantages of the prior art and gives improved strength in the hardened mortar.

The invention provides the use of water-redispersible polymer powder compositions with accelerated-setting action based on a) homo- or copolymers of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes, and vinyl halides, on one or more protective colloids, and, where appropriate, antiblocking agent, to accelerate the setting construction chemistry products with hydraulically setting binders, characterized in that one or more compounds from the group consisting of alkali metal salts and alkaline earth metal salts of inorganic or organic acids are present.

DETAILED DESCRIPTION OF THE PREFERRED EMBODIMENT

Preference is given to the lithium, sodium, potassium, magnesium, and calcium salts. Preferred inorganic counterions are carbonate ion, chloride ion, sulfate ion, nitrate ion and phosphate ion. Preferred organic counter ions are carboxylate groups which derive from carboxylic acid having from 1 to 4 carbon atoms, e.g. formate ion, acetate ion, propionate ion and butyrate ion. The calcium salts are particularly preferred. The calcium salts of carboxylic acids having from 1 to 4 carbon atoms are most preferred, examples being calcium formate, calcium acetate.

Vinyl esters suitable for the base polymer are those of carboxylic acid having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 13 carbon atoms, for example VeoVa9$^R$ or VeoVa10$^R$ (trade names of the company Shell). Vinyl acetate is particularly preferred.

Suitable methacrylates or acrylates are esters of unbranched or branched alcohols having from 1 to 15 carbon atoms, for example methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate, and 2-ethylhexyl acrylate.

Examples of olefins and dienes are ethylene, propylene, and 1,3-butadiene. Suitable vinylaromatics are styrene and vinyl-toluene. A suitable vinyl halide is vinyl chloride.

Where appropriate, it is also possible to copolymerize from 0.05 to 50% by weight, preferably from 1 to 10% by weight, based on the total weight of the base polymer, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric or maleic acid, such as the diethyl and diisopropyl esters, and also maleic anhydride, ethylenically unsaturated sulfonic acids and salts of these, preferably vinylsulfonic acid, and 2-acrylamido-2-methylpropanesulfonic acid. Other examples are precrosslinking comonomers, such as unsaturated comonomers having two or more ethylenic unsaturated double bonds, e.g. divinyl adipate, diallyl maleate, allyl methacrylate or triallyl cyanurate, or postcrosslinking comonomers, e.g. acrylamidoglycolic acid (AGA), methyl methacrylamidoglycolate (MAGME), N-methylolacrylamide (NMA), N-methylolmethacrylamide, allyl N-methylolcarbamate, alkyl ethers, such as the isobutoxy ether, or esters of N-methylolacrylamide, of N-methylolmethacrylamide, or of allyl N-methylolcarbamate. Other suitable auxiliary monomers are epoxy-functional comonomers, such as glycidyl methacrylate or glycidyl acrylate. Other examples of auxiliary monomers are silicon-functional comonomers, e.g. acryloxypropyltri(alkoxy)- and methacryloxypropyltri(alkoxy)silanes, vinyltrialkoxysilanes and vinylmethyldialkoxysilanes, and examples of alkoxy groups which may be present here are methoxy radicals, ethoxy radicals, and ethoxypropylene glycol ether radicals. Mention may also be made of monomers having hydroxyl or CO groups, such as hydroxyalkyl(meth)acrylates, e.g. hydroxyethyl, hydroxypropyl or hydroxybutyl (meth)acrylate, and also compounds such as diacetoneacrylamide and acetylacetoxyethyl (meth)acrylate.

Examples of suitable homo- and copolymers are vinyl acetate homopolymers, copolymers of vinyl acetate with ethylene, copolymers of vinyl acetate with ethylene and with one or more other vinyl esters, copolymers of vinyl acetate with ethylene and acrylic ester, copolymers of vinyl acetate with ethylene and vinyl chloride, styrene-acrylic ester copolymers, styrene-1,3-butadiene copolymers.

Preference is given to vinyl acetate homopolymers;

copolymers of vinyl acetate containing from 1 to 40% by weight of ethylene;

copolymers of vinyl acetate containing from 1 to 40% by weight of ethylene and from 1 to 50% by weight of one or more other comonomers from the group of vinyl esters having from 1 to 12 carbon atoms in the carboxy radical, e.g. vinyl propionate, vinyl laurate, vinyl esters of alpha-branched carboxylic acids having from 9 to 13 carbon atoms, e.g. VeoVa9, VeoVa10, VeoVa11;

copolymers of vinyl acetate, from 1 to 40% by weight of ethylene and preferably from 1 to 60% by weight of acrylates of unbranched or branched alcohols having from 1 to 15 carbon atoms, in particular n-butyl acrylate or 2-ethylhexyl acrylate; and copolymers containing from 30 to 75% by weight of vinyl acetate, from 1 to 30% by weight of vinyl laurate, or vinyl ester of an alpha-branched carboxylic acid having from 9 to 11 carbon atoms, and also from 1 to 30% by weight of acrylates of unbranched or branched alcohols having from 1 to 15 carbon atoms, in particular n-butyl acrylate or 2-ethylhexyl acrylate, which also contain from 1 to 40% by weight of ethylene;

copolymers containing vinyl acetate, from 1 to 40% by weight of ethylene, and from 1 to 60% by weight of vinyl chloride; where the polymers may also contain the amounts mentioned of the auxiliary monomers mentioned, and the % by weight data in each case give a total of 100% by weight.

Preference is also given to (meth)acrylate polymers, such as copolymers of n-butyl acrylate or 2-ethylhexyl acrylate, or copolymers of methyl methacrylate with n-butyl acrylate and/or 2-ethylhexyl acrylate;

styrene-acrylate copolymers with one or more monomers from the group of methyl acrylate, ethyl acrylate, propyl acrylate, n-butyl acrylate, 2-ethylhexyl acrylate;

vinyl acetate-acrylate copolymers with one or more monomers from the group of methyl acrylate, ethyl acrylate, propyl acrylate, n-butyl acrylate, 2-ethylhexyl acrylate, and, where appropriate, ethylene;

styrene-1,3-butadiene copolymers;

where the polymers may also contain the amounts mentioned of the auxiliary monomers mentioned, and the % by weight data in each case give a total of 100% by weight.

The selection of monomers and the selection of the proportions by weight of the comonomers here takes place in such a way that the resultant glass transition temperature Tg is generally from −50° C. to +50° C., preferably from −30° C. to +40° C. The glass transition temperature Tg of the polymers may be determined in a known manner by differential scanning calorimetry (DSC). The Tg may also be approximated by the Fox equation. According to T. G. Fox, Bull. Am. Physics Soc. 1, 3, page 123 (1956): $1/Tg=x1/Tg1+x2/Tg2+\ldots+xn/Tgn$, where xn is the proportion by weight (% by weight/100) of monomer n and Tgn is the glass transition temperature in degrees Kelvin of the homopolymer of monomer n. Tg values for homopolymers are listed in Polymer Handbook 2nd Edition, J. Wiley & Sons, New York (1975).

The homo- and copolymers are prepared by emulsion polymerization or suspension polymerization, preferably by emulsion polymerization, generally at a polymerization temperature of from 40 to 100° C., preferably from 60 to 90° C. When gaseous comonomers, such as ethylene, 1,3-butadiene or vinyl chloride, are copolymerized it is also possible to operate under pressure, generally between 5 bar and 100 bar.

The polymerization is initiated using initiators commonly used for emulsion polymerization or suspension polymerization, these being water-soluble or, respectively, monomer-soluble initiators, or redox initiator combinations. Examples of water-soluble initiators are the sodium, potassium, and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, azobisisobutyronitrile. Examples of monomer-soluble initiators are dicetyl peroxydicarbonate, dicyclohexyl peroxydicarbonate, dibenzoyl peroxide. The amount used of the initiators mentioned is generally from 0.001 to 0.02% by weight, preferably from 0.001 to 0.01% by weight, based in each case on the total weight of the monomers.

Redox initiators used are combinations of the initiators mentioned with reducing agents. Suitable reducing agents are the sulfites and bisulfites of alkali metals and of ammonium, for example sodium sulfite, the derivatives of sulfoxylic acid, such as the formaldehyde-sulfoxylate of zinc or of an alkali metal, e.g. sodium hydroxymethanesulfinate, and ascorbic acid. The amount of reducing agent is generally from 0.001 to 0.03% by weight, preferably from 0.001 to 0.015% by weight, based in each case on the total weight of the monomers.

To control the molecular weight, regulating substances may be used during the polymerization. If regulators are used, they are usually used in amounts of from 0.01 to 5.0% by weight, based on the monomers to be polymerized, and are fed separately or else dosed in a form premixed with reaction components. Examples of substances of this type are n-dodecyl mercaptan, tert-dodecyl mercaptan, mercaptopropionic acid, methyl mercaptopropionate, isopropanol and acetaldehyde.

Suitable protective colloids are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl, hydroxypropyl derivatives; proteins, such as casein or caseinate, soy protein, gelatin; lignosulfonates; synthetic polymers, such as poly(meth)acrylic acid, copolymers of (meth)acrylates with carboxy-functional comonomer units, poly(meth)acrylamide, polyvinylsulfonic acids and their water-soluble copolymers; melamine-formaldehyde sulfonates, naphthalene-formaldehyde sulfonates, styrene-maleic acid copolymers and vinyl ether-maleic acid copolymers.

Preference is given to partially hydrolyzed or fully hydrolyzed polyvinyl alcohols whose degree of hydrolysis is from 80 to 100 mol %, in particular partially hydrolyzed polyvinyl alcohols whose degree of hydrolysis is from 80 to 95 mol % and whose Höppler viscosity in 4% aqueous solution is from 1 to 30 mPas (Höppler method at 20° C., DIN 53015). Preference is also given to partially hydrolyzed, hydrophobicized polyvinyl alcohols whose degree of hydrolysis is from 80 to 95 mol % and whose Höppler viscosity in 4% strength aqueous solution is from 1 to 30 mPas. Examples of these are partially hydrolyzed copolymers of vinyl acetate with hydrophobic monomers, such as isopropenyl acetate, vinyl pivalate, vinyl ethylhexanoate, vinyl esters of saturated alpha-branched monocarboxylic acids having 5 or from 9 to 11 carbon atoms, dialkyl maleates, and dialkyl fumarates, e.g. diisopropyl maleate and diisopropyl fumarate, vinyl chloride, vinyl alkyl ethers, such as vinyl butyl ether, olefins, such as ethene and decene. The proportion of the hydrophobic units is preferably from 0.1 to 10% by weight, based on the total weight of the partially hydrolyzed polyvinyl alcohols. Mixtures of the polyvinyl alcohols mentioned may also be used.

Most preference is given to polyvinyl alcohols whose degree of hydrolysis is from 85 to 94 mol % and whose Höppler viscosity in 4% strength aqueous solution is from 3 to 15 mPas (Höppler method at 20° C., DIN 53015). The protective colloids mentioned are accessible by means of processes known to the person skilled in the art, their total amounts generally used during the polymerization being from 1 to 20% by weight, based on the total weight of the monomers.

If the polymerization is carried out in the presence of emulsifiers, the amount of these is from 1 to 5% by weight, based on the amount of monomer. Suitable emulsifiers are either anionic, cationic, or non ionic emulsifiers, for example anionic surfactants, such as alkyl sulfates whose chain length is from 8 to 18 carbon atoms, alkyl or alkyl aryl ether sulfates having from 8 to 18 carbon atoms in the hydrophobic radical and up to 40 ethylene oxide or propylene-oxide units, alkyl- or alkylarylsulfonates having from 8 to 18 carbon atoms, esters and half-esters of sulfosuccinic acid with monohydric alcohols or with alkylphenols, or non ionic surfactants, such as alkyl polyglycol ethers or alkylaryl polyglycol ethers having from 8 to 40 ethylene oxide units.

After conclusion of the polymerization, post-polymerization may be carried out by known methods to remove residual monomer, generally using redox-catalyst-initiated post-polymerization. Volatile residual monomers may also be removed by distillation, preferably at reduced pressure, and, where appropriate, by passing inert carrier gases, such as air, nitrogen, or steam, through or over the product. The aqueous dispersions thus obtainable have a solids content of from 30 to 75% by weight, preferably from 50 to 60% by weight.

To prepare the water-redispersible polymer powders, the aqueous dispersions are dried, where appropriate after adding protective colloid as spraying aid, for example by means of fluidized-bed drying, freeze drying, or spray drying. The dispersions are preferably spray dried. This spray drying may take place in conventional spray drying systems, with atomization by means of single-, twin-, or multifluid nozzles, or using a rotating disk. The discharge temperature selected is generally in the range from 45° C. to 120° C., preferably from 60° C. to 90° C., depending on the system, the Tg of the resin, and the desired degree of drying.

The total amount of the spraying aid (protective colloid) used is generally from 3 to 30% by weight, based on the polymeric constituents of the dispersion. This means that the total amount of protective colloid prior to the drying procedure is to be from 3 to 30% by weight, based on the polymer content; it is preferable to use from 5 to 20% by weight, based on the polymer content.

Suitable spraying aids are partially hydrolyzed polyvinyl alcohols; polyvinylpyrrolidones; polysaccharides in a water-soluble form, such as starches (amylose and amylopectin), celluloses and their carboxymethyl, methyl, hydroxyethyl or hydroxypropyl derivatives; proteins, such as casein or caseinate, soy protein, gelatin; lignosulfonate; synthetic polymers, such as poly(meth)acrylic acid, copolymers of (meth)acrylates with carboxy-functional comonomer units, poly(meth) acrylamide, polyvinylsulfonic acids and water-soluble copolymers of these; melamine-formaldehyde sulfonates, naphthalene-formaldehyde sulfonates, styrene-maleic acid copolymers, vinyl ether-maleic acid copolymers. It is preferable that no protective colloids other than polyvinyl alcohols are used as spraying aids, the polyvinyl alcohols preferred as protective colloids also being used as spraying aids.

Up to 1.5% by weight content of antifoam, based on the base polymer, has often proven useful during spraying. An antiblocking agent (anticaking agent), preferably at up to 30% by weight, based on the total weight of polymeric constituents, may be added to the powder obtained in order to increase storage stability via an increase in blocking resistance, in particular in the case of powders with a low glass transition temperature. Examples of antiblocking agents are calcium carbonate, magnesium carbonate, talc, calcium sulfate, silica, kaolins, silicates with particle sizes preferably in the range from 10 nm to 10 μm.

The viscosity of the feed to be sprayed is adjusted via the solids content so as to give a "Brookfield viscosity" (at 20 revolutions and 23° C.) value of <500 mPas, preferably <250 mPas. The solids content of the dispersion to be sprayed is >35%, preferably >40%.

In order to improve performance characteristics, other additives may be added during the spraying process. Examples of other constituents present in preferred embodiments of dispersion powder compositions are pigments, fillers, foam stabilizers, hydrophobicizing agents.

To prepare the polymer powder composition, the setting-accelerator component is added to the appropriate polymer dispersion immediately prior to the spray drying process and the material is then sprayed. Where appropriate, the setting-accelerator component may also be added after the drying process in powder form. The redispersion powder preferably comprises from 1 to 20% by weight, particularly preferably from 3 to 15% by weight, of the accelerated-setting component, based in each case on the total weight of the polymer powder composition.

The water-redispersible polymer powder compositions may be used in the application sectors typical for these, for example in construction chemistry products, where appropriate in association with hydraulically setting binders, such as cements (Portland, alumina, pozzalanic, slag, magnesia, phosphate cement), calcium sulfate, and water glass, for producing construction adhesives, in particular tile adhesive and exterior insulation system adhesive, plasters and renders, trowelling compositions, floor-filling compositions, self-leveling compositions, sealing slurries, jointing mortars, or paints. Preferred application sectors are spray mortar or spray concrete for construction work in civil or structural engineering, or else in the lining of tunnel walls.

The invention use gives additives which effectively accelerate cement setting, without any reduction in the mechanical strength of the finished mortar. The user moreover has the advantage of one fewer component requiring handling at the construction site when the mortar is modified with redispersion powder.

EXAMPLES

Dispersion

The dispersion used comprises a polyvinyl alcohol stabilized dispersion of a copolymer of vinyl acetate and ethylene.

The preparation method uses emulsion polymerization methods known to the person skilled in the art. 10% by weight of a polyvinyl alcohol whose degree of hydrolysis was 88 mol % and whose Höppler viscosity was 4 mPas were used for stabilization. The composition of the copolymer was 92% by weight of vinyl acetate and 8% by weight of ethylene.

Powders:

The powders were prepared by spray drying of the dispersion mentioned with addition of the respective accelerator and 8% by weight of a polyvinyl alcohol whose degree of hydrolysis was 88 mol % and whose Höppler viscosity was 4 mPas.

The dispersion was then sprayed by means of a twin-fluid nozzle. Air previously compressed to 4 bar served as spraying component, and the droplets formed were dried using air heated to 125° C. and flowing concurrently. The resultant dried powder was treated with 10% by weight commercially available antiblocking agent (calcium magnesium carbonate).

Accelerators:
CaAc=calcium acetate
CaFo=calcium formate
CaNi=calcium nitrate
AmSu=ammonium aluminum sulfate (comparison)
AlSu=aluminum sulfate (comparison)
AlAc=Aluminum acetate (comparison)
CaPh=calcium phosphate
LiCo=lithium carbonate
NaAc=sodium acetate
NaFo=sodium formate
KAc=potassium acetate
KFo=potassium formate
LiAc=lithium acetate Testing:

The powders obtained were tested for powder properties, and for the effectiveness of the accelerator in concrete.

Flowability F:

Flowability was only assessed visually via angle of rest.

Determination of Blocking Resistance BR:

To determine blocking resistance, the dispersion powder was placed in an iron pipe with a thread, and then subjected to a load from a metal ram. After the load had been applied, the material was stored for 16 hours at 50° C. in a drying cabinet. After cooling to room temperature, the powder was removed from the tube, and resistance to blocking was determined qualitatively by crushing the material. Resistance to blocking was classified as follows:

1-3=very good blocking resistance
4-6=good blocking resistance
7-8=satisfactory blocking resistance
9-10=not resistant to blocking—powder no longer free-flowing after crushing of the material.

Determination of Sedimentation Performance TS:

The sedimentation performance of the redispersion serves as a measure of the redispersibility of the powder. The redispersions were produced at 50% strength in water by the action of large shear forces.

Sedimentation performance was then determined on diluted redispersions (0.5% solids content), and for this 100 ml of this dispersion was charged to a graduated tube, and the sedimentation height of solid was measured. The data given are mm of sediment after 24 hours. Values greater than 7 indicate inadequate redispersion of the powder.

The results of the testing of flowability F, of blocking resistance BR, and of sedimentation performance TS of the redispersion powders are given in Table 1.

Determination of Tensile Bond Strengths of a Cementitious Tile Adhesive Modified with the Redispersion Powders:

Tensile bond strengths in the tile adhesive were tested in the following mixing specification (3% polymer content):

| | |
|---|---|
| Quartz sand | 565 parts |
| Portland cement | 400 parts |
| Cellulose | 5 parts |
| Redispersion powder | 30 parts |

Tensile bond strengths were determined using three storage conditions:
28 d: 28 days of dry storage
7 d/21 w: 7 days dry/21 days wet (wet storage)
14 d/14 dc+70° C./1 d: storage under hot conditions
Table 2 gives the results of this test.

TABLE 1

| Example | Additive | Amount % by wt. | F | BR | TS |
|---|---|---|---|---|---|
| 1 | CaAc | 10 | good | 2 | 0.3 |
| 2 | CaAc | 5 | good | 2.5 | 0.4 |
| 3 | CaNi | 5 | good | 2.5 | 0.8 |
| 4 | CaFo | 10 | good | 2.5 | 0.5 |
| 5 | CaNi | 10 | good | 2.5 | 0.4 |
| 6 | CaFo | 5 | good | 2.5 | 0.8 |
| C7 | AmSu | 5 | good | 2 | 3.8 |
| C8 | AlSu | 10 | good | 5 | 6.5 |
| C9 | AlAc | 5 | good | 3.5 | 4 |
| 10 | CaFo | 10 | good | 2.5 | 0.4 |
| 11 | CaAc | 10 | good | 2 | 0.8 |
| 12 | CaFo | 10 | good | 2.5 | 1.8 |
| 13 | CaAc | 10 | good | 2.5 | 0.2 |
| 14 | CaPh | 5 | good | 2 | 1.3 |
| 15 | LiCo | 10 | good | 2 | 0.2 |
| 16 | NaAc | 5 | good | 2 | 0.2 |
| 17 | NaAc | 10 | good | 2 | 0.2 |
| 18 | NaFo | 5 | good | 2.5 | 0.3 |
| 19 | KAc | 5 | good | 3 | 0.4 |
| 20 | KFo | 5 | good | 3 | 0.4 |
| 21 | KFo | 10 | good | 3 | 0.2 |
| 22 | NaFo | 10 | good | 2.5 | 0.1 |
| 23 | LiAc | 10 | good | 4 | 0.1 |
| C24 | none | 0 | good | 4 | 0.5 |

From the data it can be seen that there is no adverse effect on the properties of the powders on modification with the inventive additives, contrasting with modification as in comparative example 7-9. Flowability, blocking resistance, and redispersibility remain substantially unchanged.

TABLE 2

| Example | 28 d N/mm$^2$ | 7 d/21 N N/mm$^2$ | 14 d/14 dc + 70/1 d N/mm$^2$ |
|---|---|---|---|
| 1 | 1.98 | 0.63 | 1.42 |
| 2 | 1.89 | 0.62 | 1.46 |
| 3 | 1.82 | 0.64 | 1.7 |
| 4 | 1.95 | 0.77 | 1.57 |
| 5 | 2.01 | 0.63 | 1.58 |
| 6 | 1.96 | 0.62 | 1.47 |
| 7 | 2.13 | 0.64 | 1.46 |
| 8 | 1.77 | 0.81 | 1.57 |
| C9 | 1.84 | 0.66 | 1.51 |
| C10 | 1.84 | 0.84 | 1.64 |
| C11 | 1.91 | 0.83 | 1.6 |
| 12 | 2.11 | 0.83 | 1.51 |
| 13 | 2.04 | 0.78 | 1.44 |
| 14 | 1.53 | 0.72 | 1.39 |
| 15 | 1.79 | 0.78 | 1.40 |

TABLE 2-continued

| Example | 28 d<br>N/mm² | 7 d/21 N<br>N/mm² | 14 d/14 dc + 70/1 d<br>N/mm² |
|---|---|---|---|
| 16 | 1.66 | 0.87 | 1.49 |
| 17 | 1.83 | 0.80 | 1.40 |
| 18 | 1.97 | 0.83 | 1.39 |
| 19 | 1.66 | 0.68 | 1.37 |
| 20 | 1.65 | 0.72 | 1.47 |
| 21 | 1.7 | 0.71 | 1.42 |
| 22 | 1.95 | 0.83 | 1.76 |
| 23 | 2.04 | 0.64 | 1.50 |
| C24 | 1.63 | 0.57 | 1.36 |

The favorable effect on tensile bond strength, in particular after storage under wet conditions, is clearly visible.

What is claimed is:

1. A process for accelerating the setting of construction chemistry products containing hydraulically setting binders, comprising adding an accelerant composition containing a water-redispersible polymer powder composition consisting essentially of a) homo- or copolymers of one or more monomers selected from the group consisting of vinyl esters of unbranched or branched $C_{1-15}$ alkylcarboxylic acids, methacrylic esters and acrylic esters of $C_{1-15}$ alcohols, vinylaromatics, olefins, dienes, and vinyl halides, and one or more protective colloids, and optionally, one or more antiblocking agent(s), and b) one or more accelerant compounds selected from the group of alkali metal salts and alkaline earth metal salts of organic $C_{1-4}$ carboxylic acids, added to said water-redispersible polymer following polymerization, the accelerant(s) being present in an amount of from 3 weight percent to 20 weight percent based on the total weight of the redispersible powder composition.

2. The process of claim 1, wherein said accelerant compound(s) comprise magnesium or calcium salts of $C_{1-4}$ carboxylic acids.

3. The process of claim 1, wherein said accelerant compound(s) comprise calcium salts of $C_{1-4}$ carboxylic acids.

4. The process of claim 1, wherein the homo- or copolymers consist of at least one of vinyl acetate homopolymers, copolymers of vinyl acetate with ethylene, copolymers of vinyl acetate with ethylene and with one or more other vinyl esters, copolymers of vinyl acetate with ethylene and acrylic ester, copolymers of vinyl acetate with ethylene and vinyl chloride, styrene-acrylic ester copolymers, or styrene-1,3-butadiene copolymers.

5. The process of claim 1, wherein said protective colloid comprises partially hydrolyzed or fully hydrolyzed, optionally hydrophobicized polyvinyl alcohols having a degree of hydrolysis of from 80 to 100 mol % and having a Höppler viscosity of from 1 to 30 mPas in 4% strength aqueous solution.

6. The process of claim 1, wherein the amount of the setting-accelerant component b), based on the total weight of the redispersible powder composition, is from 3 to 15% by weight.

7. The process of claim 1, wherein the construction chemistry product is one selected from the group consisting of construction adhesives, tile adhesives, exterior insulation system adhesives, plasters and renders, trowelling compositions, floor-filling compositions, self-leveling compositions, sealing slurries, jointing mortars, and paints.

8. The process of claim 1, wherein the construction chemistry product is a spray mortar or spray concrete for construction work in civil or structural engineering, or in the lining of tunnel walls.

9. The process of claim 1, wherein the water-redispersible polymer powder composition comprises a vinyl acetate and ethylene copolymer stabilized by a polyvinyl alcohol protective colloid.

10. The process of claim 1, wherein said homo- or copolymers of one or more monomers selected from the group consisting of vinyl esters of unbranched or branched $C_{1-15}$ alkylcarboxylic acids, methacrylic esters and acrylic esters of $C_{1-15}$ alcohols, vinylaromatics, olefins, dienes, and vinyl halides consists essentially of a vinyl acetate and ethylene copolymer stabilized by a partially hydrolyzed hydrophobicized polyvinyl alcohol protective colloid.

11. The process of claim 1, wherein said homo- or copolymers of one or more monomers selected from the group consisting of vinyl esters of unbranched or branched $C_{1-15}$ alkylcarboxylic acids, methacrylic esters and acrylic esters of $C_{1-15}$ alcohols, vinylaromatics, olefins, dienes, and vinyl halides consists of a copolymer of vinyl acetate, ethylene, and at least one vinyl ester other than vinyl acetate, stabilized by a polyvinyl alcohol protective colloid.

12. The process of claim 11, where the vinyl ester other than vinyl acetate is selected from the group consisting of vinyl propionate, vinyl laurate, and vinyl esters of α-branched $C_{9-13}$ carboxylic acids.

13. The process of claim 1, wherein the accelerant(s) are added to an aqueous dispersion of redispersible polymer, and the resultant mixture is spray dried to produce the accelerant composition.

* * * * *